(12) United States Patent
Yin et al.

(10) Patent No.: US 11,047,548 B2
(45) Date of Patent: Jun. 29, 2021

(54) LENS, LIGHT SOURCE MODULE AND LIGHTING DEVICE

(71) Applicant: OPPLE LIGHTING CO., LTD., Shanghai (CN)

(72) Inventors: Song Yin, Shanghai (CN); Shitao Deng, Shanghai (CN); Jianguo Li, Shanghai (CN); Ming Chen, Shanghai (CN); Aiqin Huang, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 16/439,310

(22) Filed: Jun. 12, 2019

(65) Prior Publication Data

US 2019/0293262 A1 Sep. 26, 2019

Related U.S. Application Data

(63) Continuation of application No. PCT/CN2017/119294, filed on Dec. 28, 2017.

(30) Foreign Application Priority Data

Dec. 29, 2016 (CN) .......................... 201611247479.4
Dec. 29, 2016 (CN) .......................... 201621467209.X
Dec. 29, 2016 (CN) .......................... 201621468253.2

(51) Int. Cl.
*F21V 5/04* (2006.01)
*F21V 17/04* (2006.01)
(Continued)

(52) U.S. Cl.
CPC *F21V 5/04* (2013.01); *F21S 8/00* (2013.01); *F21V 17/04* (2013.01); *F21V 19/00* (2013.01); *G02B 27/0955* (2013.01)

(58) Field of Classification Search
CPC .. F21V 5/04; F21V 17/04; F21V 19/00; F21S 8/00; G02B 27/0955
See application file for complete search history.

(56) References Cited

U.S. PATENT DOCUMENTS 7,254,309 B1* 8/2007 Chou ................. G02B 19/0028
385/146
7,967,477 B2* 6/2011 Bloemen ................. F21V 5/045
362/299

(Continued)

FOREIGN PATENT DOCUMENTS

CN 105264288 A 1/2016
CN 105351886 A 2/2016

(Continued)

OTHER PUBLICATIONS

International Search Report (including English translation) and Written Opinion issued in PCT/CN2017/119294, dated Apr. 3, 2018, 12 pages.

*Primary Examiner* — Bryon T Gyllstrom
*Assistant Examiner* — Christopher E Dunay
(74) *Attorney, Agent, or Firm* — Arch & Lake LLP

(57) ABSTRACT

The present disclosure discloses a lens, a light source module and a lighting device. The lens includes a bottom surface, an inner surface, an outer surface, and a first accommodating chamber configured for accommodating a light-emitting assembly, a wall face of the first accommodating chamber being an inner surface of the lens; where, the inner surface has a sawtooth shape, and a first light incident surface, a second light incident surface and a third light incident surface, the outer surface includes a first light-emitting surface, a second light-emitting surface and a third light-emitting surface.

20 Claims, 13 Drawing Sheets

(51) Int. Cl.
*G02B 27/09* (2006.01)
*F21S 8/00* (2006.01)
*F21V 19/00* (2006.01)

(56) References Cited

U.S. PATENT DOCUMENTS

| | | | | |
|---|---|---|---|---|
| 8,068,288 B1* | 11/2011 | Pitou | .................... | G02B 3/08 |
| | | | | 359/743 |
| 9,488,864 B2* | 11/2016 | Tran | .................... | F21V 5/04 |
| 9,632,295 B2* | 4/2017 | Castillo | ............. | G02B 19/0061 |
| 2009/0129097 A1* | 5/2009 | Ewert | ................ | G02B 19/0028 |
| | | | | 362/328 |
| 2014/0140069 A1* | 5/2014 | Premysler | ............... | F21S 8/085 |
| | | | | 362/308 |

FOREIGN PATENT DOCUMENTS

| | | |
|---|---|---|
| CN | 106500012 A | 3/2017 |
| CN | 206291098 U | 6/2017 |
| CN | 206330085 U | 7/2017 |
| CN | 206478514 U | 9/2017 |
| WO | 2010032942 A2 | 3/2010 |

\* cited by examiner

LENS, LIGHT SOURCE MODULE AND LIGHTING DEVICE

CROSS-REFERENCE TO RELATED APPLICATIONS

This application is based upon and claims the priority of PCT patent application No. PCT/CN2017/119294 filed on Dec. 28, 2017 which claims the priority of Chinese Patent Application No. 201611247479.4 filed on Dec. 29, 2016, and Chinese Patent Application No. 201621467209.X filed on Dec. 29, 2016, and Chinese Patent Application No. 201621468253.2 filed on Dec. 29, 2016, the entire content of all of which is hereby incorporated by reference herein for all purposes.

TECHNICAL FIELD

The present disclosure relates to a lighting field, and more particularly, to a lens, a light source module and a lighting device.

BACKGROUND

With respect to a lighting device used in application fields such as a television backlight, a ceiling lamp, an advertising light box, and the like, its light source module needs to have dual characteristics of large-angle irradiation and uniform irradiation.

SUMMARY

The present disclosure provides a lens and a light source module.

According to one aspect of the present disclosure, there is provided a lens. The lens may include a bottom surface, an inner surface, an outer surface, and a first accommodating chamber configured for accommodating a light-emitting assembly, a wall face of the first accommodating chamber being the inner surface of the lens, and the lens having an axisymmetric structure.

The inner surface may include a sawtooth-shaped cross-section a first light incident surface protruding toward the first accommodating chamber and at least two pairs of tooth corners extending into the first accommodating chamber; a first pair of tooth corners may include second light incident surfaces provided opposite to each other, and a second pair of tooth corners may include third light incident surfaces provided opposite to each other.

The outer surface may include two first light-emitting surfaces located at a middle top region and opposite to each other, second light-emitting surfaces located on two sides of the two first light-emitting surfaces and intersecting with adjacent first light-emitting surfaces, and a third light-emitting surface extending from the second light-emitting surface to the bottom surface, where the two first light-emitting surfaces may constitute a V-shaped structure, and the third light-emitting surface is a curved surface protruding away from the first accommodating chamber.

According to another aspect of the present disclosure, there is further provided a light source module. The light source module may include a lens and a light-emitting assembly comprising a light source board, and a light emitting unit located on the light source board, wherein the lens may include a bottom surface, an inner surface, an outer surface, and a first accommodating chamber configured for accommodating a light-emitting assembly, a wall face of the first accommodating chamber being the inner surface of the lens, and the lens having an axisymmetric structure.

The inner surface may include a sawtooth-shaped cross-section a first light incident surface protruding toward the first accommodating chamber and at least two pairs of tooth corners extending into the first accommodating chamber; a first pair of tooth corners may include second light incident surfaces provided opposite to each other; and a second pair of tooth corners may include third light incident surfaces provided opposite to each other.

The outer surface may include two first light-emitting surfaces located at a middle top region and opposite to each other, second light-emitting surfaces located on two sides of the two first light-emitting surfaces and intersecting with adjacent first light-emitting surfaces, and a third light-emitting surface extending from the second light-emitting surface to the bottom surface, where the two first light-emitting surfaces may constitute a V-shaped structure, and the third light-emitting surface is a curved surface protruding away from the first accommodating chamber.

It is to be understood that both the foregoing general description and the following detailed description are exemplary and explanatory only and are not restrictive of the present disclosure.

BRIEF DESCRIPTION OF THE DRAWINGS

The drawings illustrated here are provided for further understanding the examples of the present disclosure and constitute a part of the present disclosure, and are used for explaining the present disclosure together with the examples of the present disclosure and description thereof, rather than improperly limiting the present disclosure. In the drawings.

DETAILED DESCRIPTION

Figure 1:
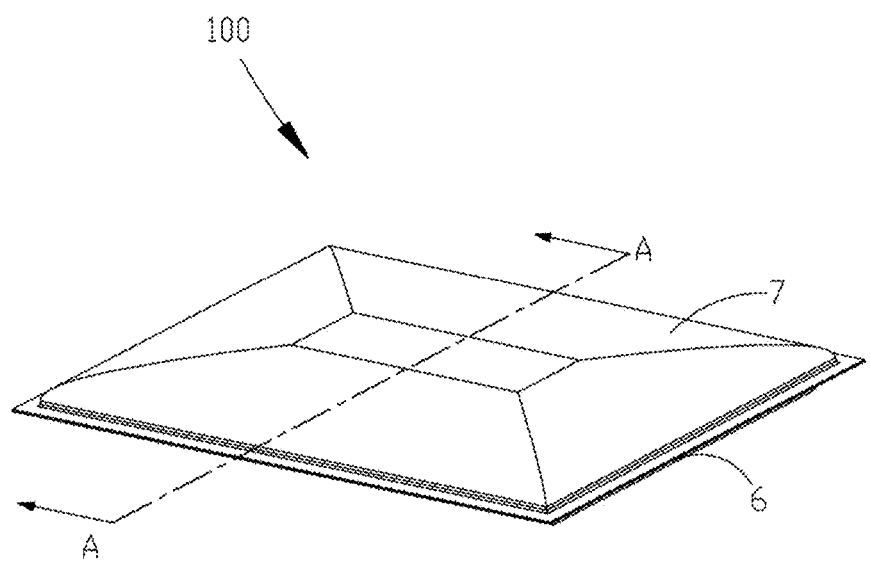
FIG. 1 is a stereoscopic view of a lighting device provided by Example 1 of the present disclosure.

In order to make objects, technical details and advantages of the present disclosure apparent, the technical solutions of the present disclosure will be described in a clearly and fully understandable way in connection with the specific examples of the present disclosure and the corresponding drawings. It is obvious that the described examples are just a part but not all of the examples of the present disclosure. Based on the examples described herein, those ordinarily skilled in the art can obtain other example(s), without any inventive work, which should be within the scope of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

A lighting device may be used in application fields such as a television backlight, a ceiling lamp, an advertising light box, and the like. Such light source module may need to have dual characteristics of large-angle irradiation and uniform irradiation. The light source module may include a light-emitting assembly, and because a light beam angle of the light-emitting assembly itself is not large enough and light energy utilization efficiency is low, thus it may be necessary to perform secondary light distribution by using a lens, so as to expand an light emitting angle, and improve light energy utilization efficiency.

Sometimes, a lens, as limited by its own shape and material properties, may not achieve a satisfactory light energy distribution and utilization effect, and may not effectively make the light emitted at a large angle with high uniformity.

Example 1

FIG. 1 to FIG. 5 illustrate a lighting device 100 according to the present disclosure, the light device 100 comprises a base plate 6, a front cover 7 coupled with the base plate 6, and a light source module 50 fixed on the base plate 6. Wherein, the front cover 7 and the base plate 6 are coupled to form a second accommodating chamber 8, and the light source module 50 is accommodated in the second accommodating chamber 8. The light source module 50 according to the example of the present disclosure may be separately used in a lamp such as a ceiling lamp or an advertising light box.

Hereinafter, respective elements within the lighting device 100 and a connection relationship between the elements provided by Example 1 of the present disclosure will be specifically described.

Figure 2:
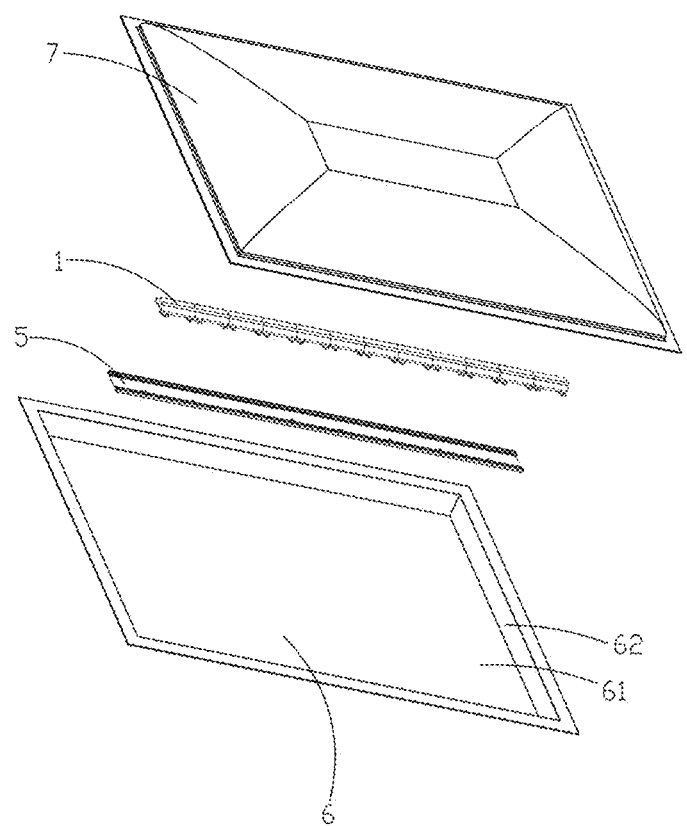
FIG. 2 is an exploded view of the lighting device illustrated in FIG. 1.
Figure 3:
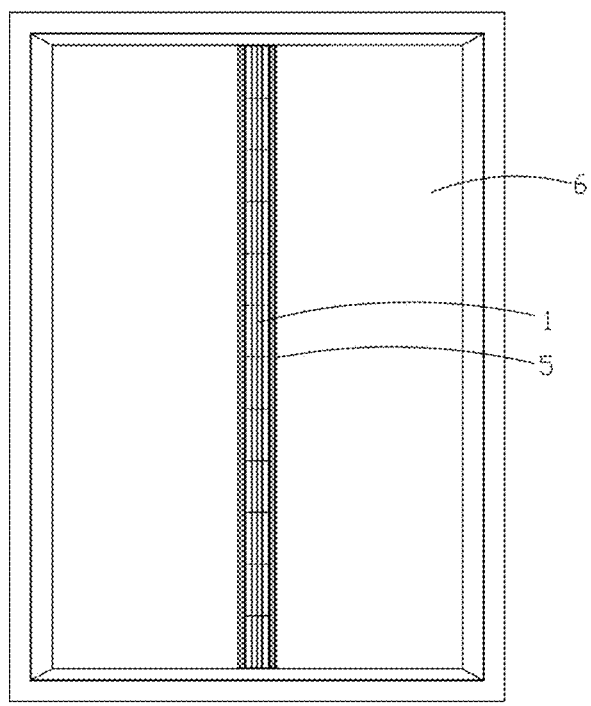
FIG. 3 is a top view after the base plate and the light source module illustrated in FIG. 2 are assembled.

As illustrated in FIG. 1 to FIG. 3, the base plate 6, with a substantially rectangular parallelepiped shape, has a flat bottom board 61 and side walls 62 extending perpendicularly from the periphery of the bottom board 61. The base plate 6 has a width greater than 550 mm, and may be made of a metal material, plastic, thermal conductive plastic, and the like. The base plate 6 may be mounted on a ceiling, or other mounting bases.

The front cover 7 covers on one side of the base plate 6; its outer surface has a certain curvature, and in other alternative implementation mode, the outer surface of the front cover 7 may also be a flat surface. The front cover 7 is made of a transparent material, for example, acrylic, and the like, which has a uniform light effect. The front cover 7 and the base plate 6 may be connected by means of plugging, clamping, screwing, and the like. In other alternative implementation mode, the front cover 7 may not be included in the lighting device 100.

Figure 4:
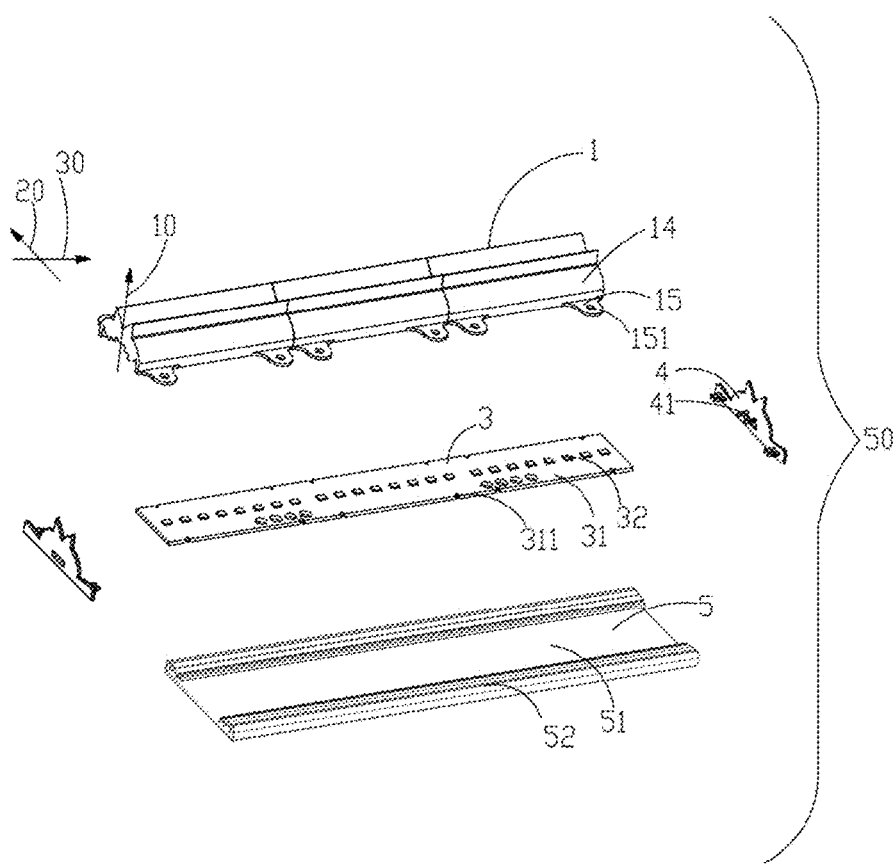
FIG. 4 is an exploded view of the light source module in the lighting device provided by Example 1 of the present disclosure.
Figure 5:
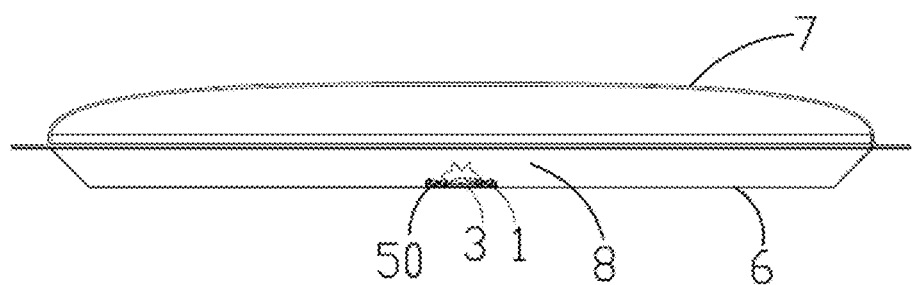
FIG. 5 is a cross-sectional view taken along line A-A of FIG. 1.
Figure 6:
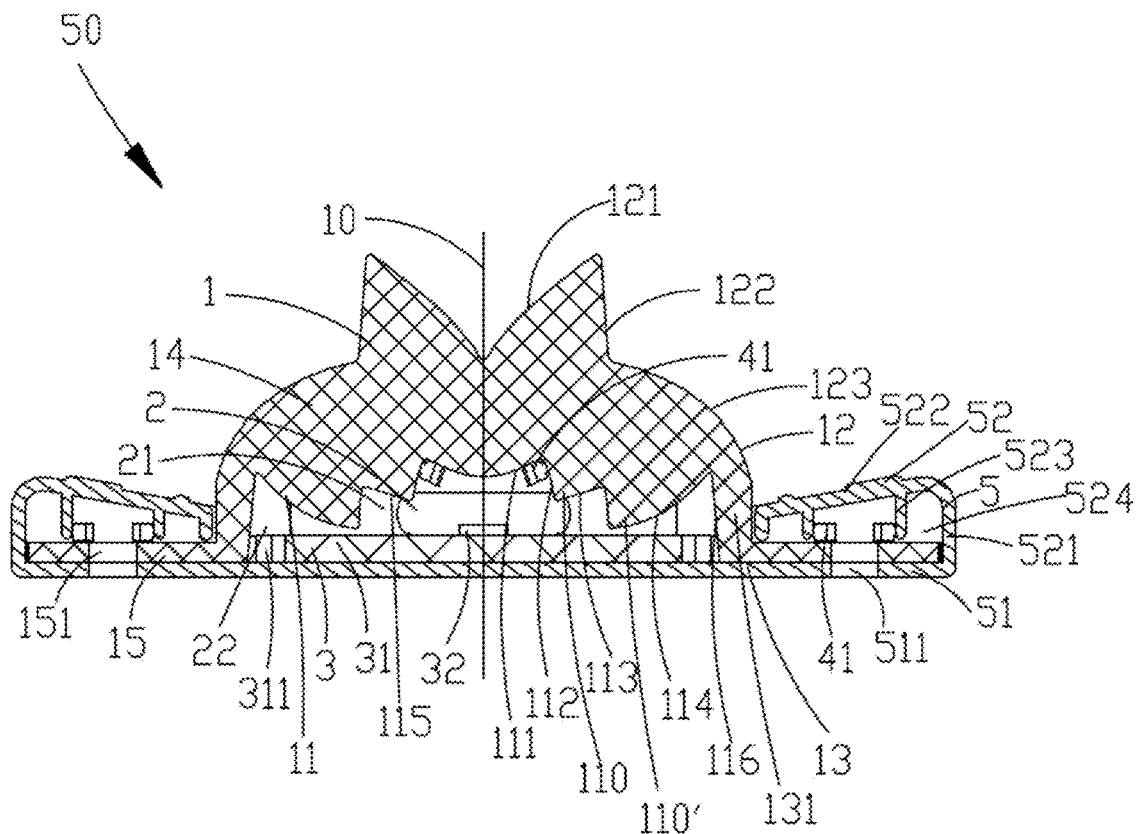
FIG. 6 is an enlarged view of the light source module in FIG. 5.

As illustrated in FIG. 4 to FIG. 6, the light source module 50 includes a mounting base 5, a lens 1 mounted on the mounting base 5, baffles 4 mounted on both ends of the lens 1, and a light-emitting assembly 3 accommodated in the lens 1, wherein, the lens 1 completely covers the mounting base 5, so that the light-emitting assembly 3 is sandwiched between the lens 1 and the mounting base 5. In this example, the light source module 50 is set as a group, two ends thereof are located at middle positions of lateral side walls of the base plate 6 and extend along a longitudinal direction of longitudinal side walls of the base plate 6, and a length of the light source module 50 is equal to a longitudinal length of the base plate 6. In other alternative implementation mode, the length of the light source module 50 may further be other length, such as ½, ⅔ of the length of the base plate 6.

The mounting base 5 has an elongated shape, and its underside is attached to the base plate 6. In this example, the mounting base 5 is made of an aluminum profile or other materials having good heat dissipation properties. The mounting base 5 has a rectangular flat base portion 51, and a pair of mounting portions 52 formed by bending the base portion 51 from both sides of long edges of the base portion 51 to make it extending in a direction toward the lens 1, the pair of mounting portions 52 is used for mounting the lens 1; and the mounting portions 52 extend toward each other and partially overlap with the base portion 51. The mounting portion 52 includes a connecting portion 521 extending perpendicularly from a side edge and a gripping portion 522 extending obliquely from the connecting portion 521, the gripping portion 522 extends toward the base portion 51 to form a plurality of rib portions 523 arranged at intervals, the base portion 51 and the mounting portion 52 form a mounting region 524 for clamping and fixing the lens 1, and a portion of the base portion 51 located at the mounting region 524 is provided with a plurality of first mounting holes 511. In other alternative implementation mode, the mounting base 5 may not be provided, and the lens 1 may be mounted directly on the base plate 6. In this implementation mode, a plurality of straight bar-shaped lenses 1 are mounted within the mounting base 5, and the plurality of lenses 1 are abutted end to end. In other implementation mode, only one straight bar-shaped lens 1 may be mounted.

The light-emitting assembly 3 is fixed on the base portion 51 of the mounting base 5, and includes an elongated integrated light source board 31 and a plurality of light emitting units 32 arranged along a lengthwise direction on the light source board 31. The light source board 31 has an elongated shape, a plurality of grooves 311 for snap-connecting with the lens 1 are provided on both sides of the light source board 31, and the plurality of light emitting units 32 are arranged in a single row along the longitudinal direction of the light source board 31. A surface of one side of the light source board 31 on which the light emitting unit 32 is not provided is attached to the mounting base 5. In this implementation mode, the light source board 31 is of an integrated type, and the light emitting unit 32 is an LED light source. In other implementation mode, the light source board 31 may also be segmented, and the light emitting unit 32 may also be a TL light source or other light source. A driving power assembly (not shown) and the light-emitting assembly 3 may be separately provided or integrated.

The lens 1 has a linear shape and is integrally stretched, the lens 1 has a main body portion 14 stretched along the lengthwise direction, a width of the main body portion 14 is less than 32 mm, and a first accommodating chamber 2 is provided within the main body portion 14. A plurality of connecting portions 15 provided with second mounting holes 151 protruding outward are provided at intervals along the lengthwise direction on both sides of a lowermost end of the main body portion 14 of the lens 1. The lens 1 is detachably assembled to the mounting base 5 along the lengthwise direction, the connecting portion 15 is detachably accommodated within the gripping portion 522, and further the lens 1 together with the mounting base 5 is fixed onto the base plate 6 with screws (not shown) passing through the base plate 6, the first mounting hole 511 on the mounting base 5, and the second mounting hole 151 on the connecting portion 15. The baffles 4 enclose the first accommodating chamber 2 of the lens 1 and are assembled on the mounting base 5 in a pairwise manner, the baffle 4 is attached to an end surface of the lens 1, and a plurality of elastic clamping portions 41 perpendicularly extending from an end surface of a side of the baffle 4 toward the lens 1 and the mounting base 5 are provided on the baffle 4, the elastic clamping portion 41 is simultaneously coupled with the lens 1 and the mounting portion 52 of the mounting base 5 in a clamping manner, wherein, a pair of elastic clamping portions 41 are coupled with the first accommodating chamber 2 of the lens 1 in a clamping manner. The baffles 4 are made of an opaque material, and provided at both ends of the lens 1 to prevent light loss of the light-emitting assembly 3 due to light emitted from the two ends of the lens 1.

The lens 1 has an axisymmetric structure and extends in the longitudinal direction 30; a direction perpendicular to the longitudinal direction 30 is a lateral direction 20; and a central axis 10 is orthogonal to both the lateral direction 20 and the longitudinal direction 30. All cross-sections of the lens 1 in the longitudinal direction 30 are the same.

As illustrated in FIG. 6, the lens 1 has an inner surface 11, an outer surface 12, a bottom surface 13, and the first accommodating chamber 2 for accommodating the light-emitting assembly 3, a wall surface of the first accommodating chamber 2 is formed as enclosed by the inner surface 11 of the lens 1 and a bottom surface of the mounting base 5.

The inner surface 11 has a sawtooth-shaped cross-section, and includes a first light incident surface 111 protruding toward the first accommodating chamber 2, a pair of first tooth corners 110, and a pair of second tooth corners 110', both the pair of first tooth corners 110 and the pair of second tooth corners 110' being extending into the first accommodating chamber 2; the pair of first tooth corners 110 and the pair of second tooth corners 110' are respectively provided symmetrically with respect to the central axis 10, and a tip of the second tooth corner 110' is closer to the bottom surface 13 than a tip of the first tooth corner 110. The pair of first tooth corners 110 include second light incident surfaces 112 provided opposite to each other and bottom surfaces 115 provided opposite to each other, the pair of second tooth corners 110' include third light incident surfaces 113 provided opposite to each other and two reflecting surfaces 114, the second light incident surface 112 is an adjacent surface of the first light incident surface 111, adjacent surfaces of the reflecting surface 114 are respectively the third light incident surface 113 and a side wall face 116, and the reflecting surface 114 is a bottom wall face of the first accommodating chamber 2. In this implementation mode, the first light incident surface 111 is a curved surface, the second light incident surface 112 and the third light incident surface 113 are flat surfaces, and the reflecting surface 114 is a curved surface protruding outward. In other implementation mode, the three types of light incident surfaces may all be curved surfaces, or may all be flat surfaces. The reflecting surface 114 may be a curved surface or a flat surface, and the reflecting surface 114 is a total internal reflecting surface.

Figure 7:
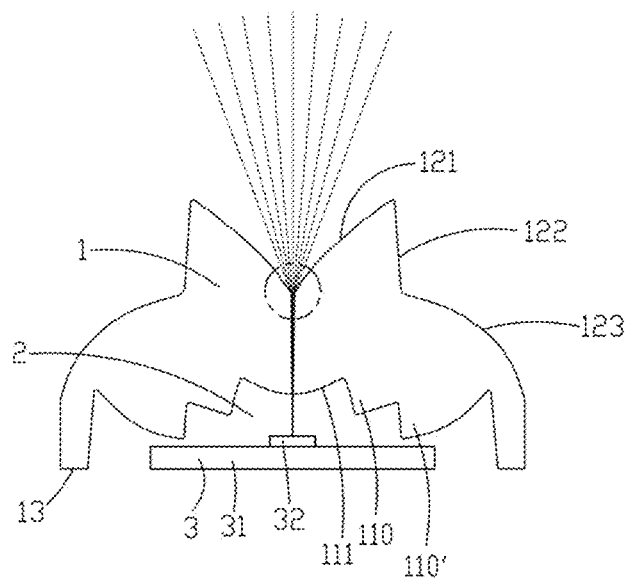
FIG. 7 is a portion of an optical path diagram based on FIG. 6.
Figure 8:
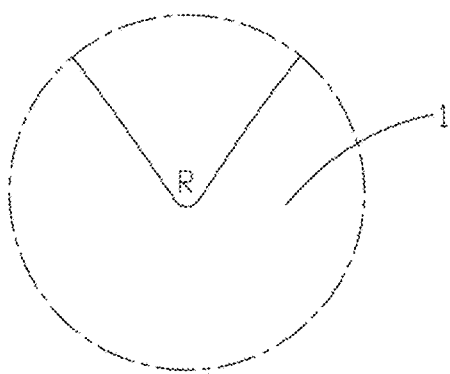
FIG. 8 is an enlarged view of a portion of FIG. 7.

As illustrated in FIG. 7 and FIG. 8, the outer surface 12 includes first light-emitting surfaces 121 located at a middle top region and opposite to each other, second light-emitting surfaces 122 located on two sides of the two first light-emitting surfaces 121 and respectively intersecting with the adjacent first light-emitting surfaces 121, and third light-emitting surfaces 123 extending from the second light-emitting surfaces 122 to the bottom surface 13; the two first light-emitting surfaces 121 are symmetric with respect to the central axis 10 and have a V-shaped structure; and a circular-arc shaped chamfer, that is, having an R angle, is formed at an intersection of the two first light-emitting surfaces 121. The first light-emitting surface 121 may be a curved surface, or may also be a flat surface. The second light-emitting surface 122 is a flat surface, which may be parallel to the central axis 10, and may also have a certain slope. The third light-emitting surface 123 is a curved surface protruding away from the first accommodating chamber 2.

The first accommodating chamber 2 includes a first accommodating region 21 and a second accommodating region 22; the first accommodating region 21 is enclosed by the first light incident surface 111, the second light incident surfaces 112 provided opposite to each other, the bottom surfaces 115, and the third light incident surfaces 113; and the second accommodating region 22 is enclosed by the reflecting surface 114 and the side wall face 116. The first accommodating region 21 accommodates the light emitting unit 32, the second accommodating region 22 accommodates the light source board 31; and in other implementation mode, the light-emitting assembly 3 may be all arranged in the first accommodating region 21. The second tooth corner 110' is closer to the light source board than the first tooth corner 110.

The lens 1 further comprises a structure of a pair of upright posts 131, and the upright post 131 is composed of the side wall face 116, a portion of the outer surface corresponding to the side wall face 116, and the bottom surface 13. In this example, the connecting portion 15 extends outward perpendicularly from a lower end of the upright post 131.

Figure 9:
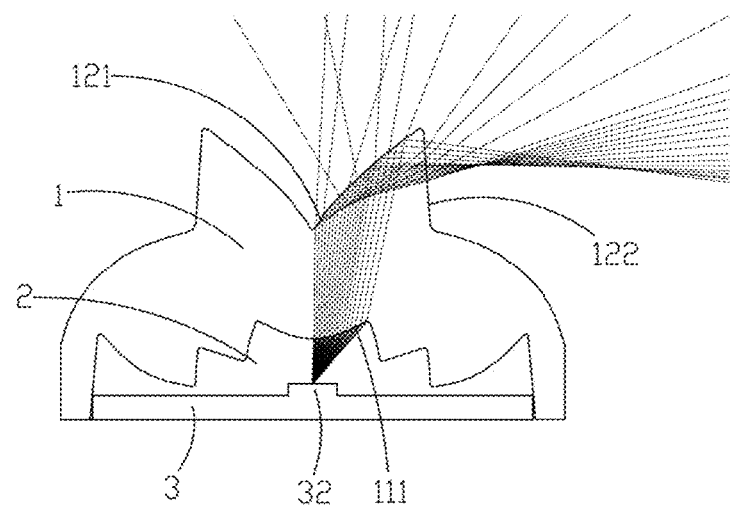
FIG. 9 is another portion of the optical path diagram of the lens based on FIG. 6.
Figure 10:
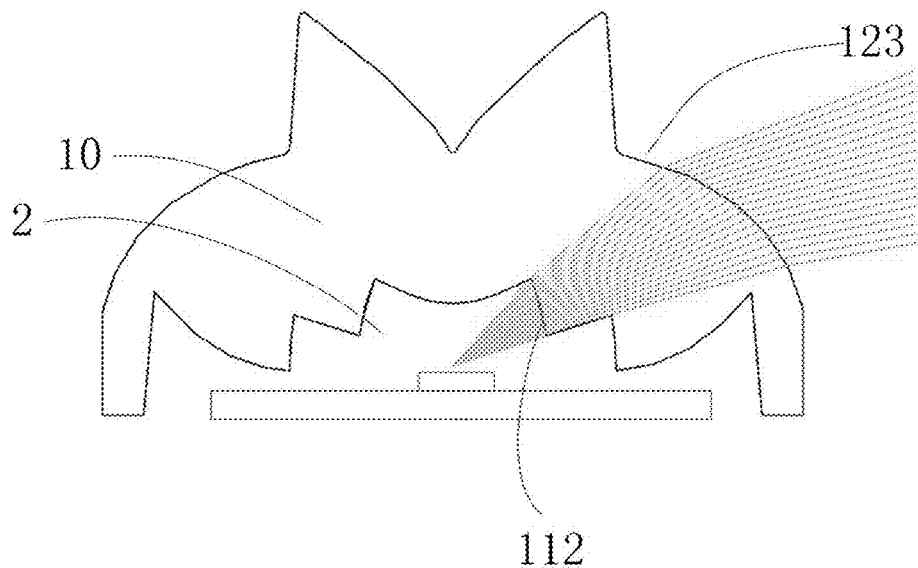
FIG. 10 is yet another portion of the optical path diagram of the lens based on FIG. 6.
Figure 11:
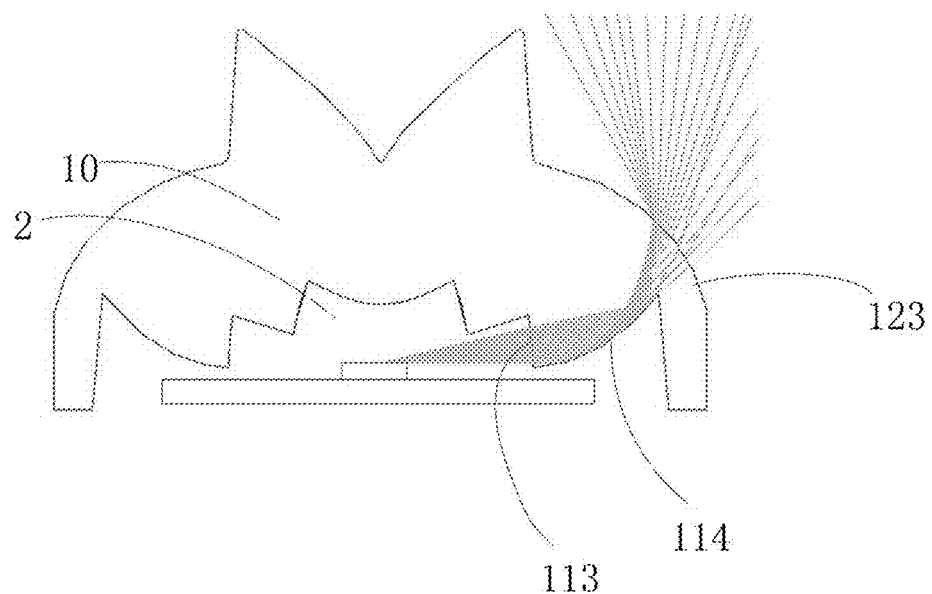
FIG. 11 is still another portion of the optical path diagram based on FIG. 6.

As illustrated in FIG. 9, collimated light incident on the R angle is refracted by the R angle and emitted out; light incident on the first light-emitting surface 121 has a large portion reflected, and a small portion refracted or directly transmitted, specifically, light directly incident on the first light incident surface 111 has one portion reflected by the first light-emitting surface 121 to the second light-emitting surface 122, then refracted by the second light-emitting surface 122 and emitted out, and the other portion directly emitted out through the first light-emitting surface 121. The outer surface of the first light-emitting surface 121 may be lightly frosted, so that the portion of light to be directly emitted out through the first light-emitting surface 121 is refracted and emitted out, or directly transmitted and emitted out. As illustrated in FIG. 10, light directly incident on the second light incident surface 112 is refracted to the third light-emitting surface 123, then refracted by the third light-emitting surface 123 and emitted out. As illustrated in FIG. 11, collimated light incident on the third light incident surface 113 is reflected by the reflecting surface 114 to the third light-emitting surface 123, then refracted thereby and emitted out. In the lighting device according to the example of the present disclosure, the design of the sawtooth-shaped incident structure on the inner surface of the lens therein, and the design of the structure having the catadioptric surface and the refracting surface combined on the outer surface thereof, enable emitted light of the lighting device to cover a large angle, and the optical path segmented design enables energy of different ranges to be respectively hit at target positions, so as to achieve the effect of increased uniformity of emitted light through superimposition. The lens 1 with a width less than 32 mm can enable the lighting device 100 with a width greater than 550 m to have light emitted uniformly, that is to say, under a condition that a width ratio of the lens 1 to the base plate 6 is less than 0.06, the emitting angle of the lens 1 sufficiently enables the entire lighting device 100 to have light emitted uniformly, and thus, a smaller quantity of lenses can be used for increase the uniform lighting area of a large volume light fixture and reduces costs.

Example 2

Figure 12:
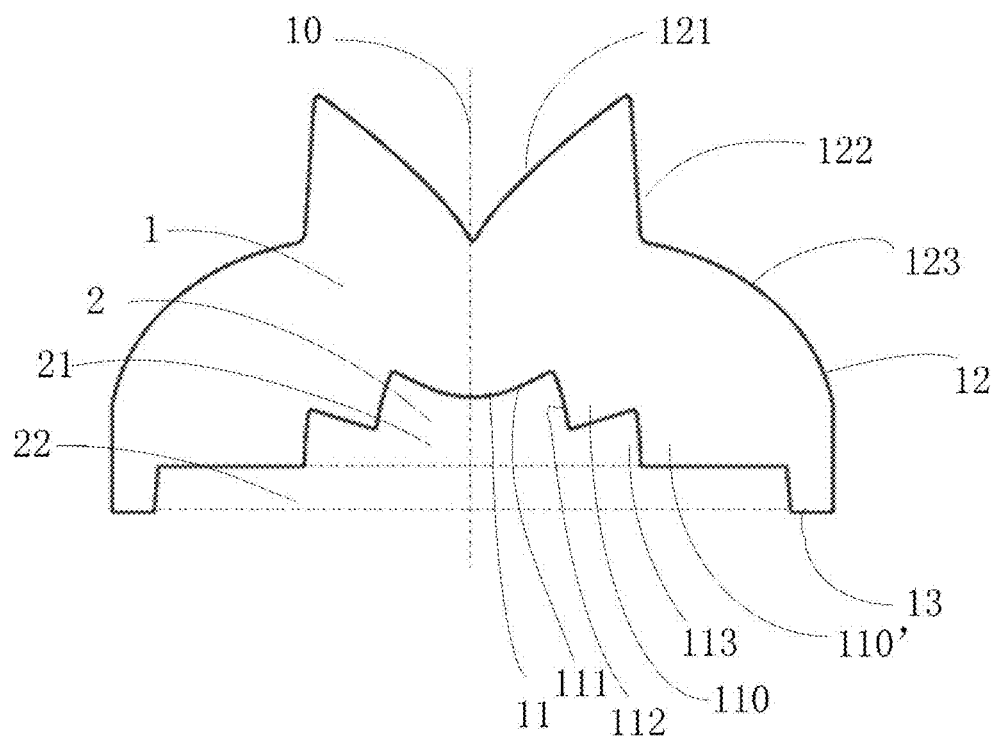
FIG. 12 is a cross-sectional view of a lens provided by Example 2 of the present disclosure.

With reference to FIG. 12, Example 2 of the present disclosure provides a lens 1a used in the lighting device 100 according to Example 1 of the present disclosure, the lens 1a has a structure similar to that of the lens 1 according to Example 1, which also has a linear shape, and its cross-section also has an axisymmetric structure with respect to the central axis 10. The lens 1a has an inner surface 11, an outer surface 12, a bottom surface 13, and a first accommodating chamber 2 for accommodating a light-emitting assembly (not shown); and a wall face of the first accommodating chamber 2 is the inner surface 11 of the lens 1a. In this implementation mode, the first accommodating chamber 2 includes a first accommodating region 21 and a second accommodating region 22, the first accommodating region 21 accommodates the light-emitting assembly (not shown), and the second accommodating region 22 accommodates a light source board (not shown); and in other implementation modes, the light-emitting assembly (not shown) may be all arranged in the first accommodating region 21.

The inner surface 11 has a sawtooth-shaped cross-section, and includes a first light incident surface 111 protruding toward the first accommodating chamber 2, a pair of first tooth corners 110, and a pair of second tooth corners 110', the pair of first tooth corners 110 and the pair of second tooth corners 110' being extending into the first accommodating chamber 2; and the pair of first tooth corners 110 and the pair of second tooth corners 110' are respectively provided symmetrically with respect to the central axis 10. The pair of first tooth corners 110 include second light incident surfaces 112 provided opposite to each other, the pair of second tooth corners 110' include third light incident surfaces 113 provided opposite to each other, and the second light incident surface 112 is an adjacent surface of the first light incident surface 111. In this implementation mode, the first light incident surface 111 is a curved surface protruding toward the first accommodating chamber 2, and the second light incident surface 112 and the third light incident surface 113 are flat surfaces. In other implementation modes, the three types of light incident surfaces may all be curved surfaces, or may all be flat surfaces.

The outer surface 12 has an axisymmetric structure, and includes first light-emitting surfaces 121 located at a middle top region and opposite to each other, second light-emitting surfaces 122 located on two sides of the two first light-emitting surfaces 121 and respectively intersecting with the adjacent first light-emitting surfaces 121, and third light-emitting surfaces 123 extending from the second light-emitting surfaces 122 to the bottom surface 13; the two first light-emitting surfaces 121 are symmetric with respect to the central axis 10 and have a V-shaped structure. The first light-emitting surface 121 may be a curved surface, or may also be a flat surface. The second light-emitting surface 122 is a flat surface, which may be parallel to the central axis 10, and may also have a certain slope. The third light-emitting surface 123 is a curved surface protruding away from the first accommodating chamber 2.

Figure 13:
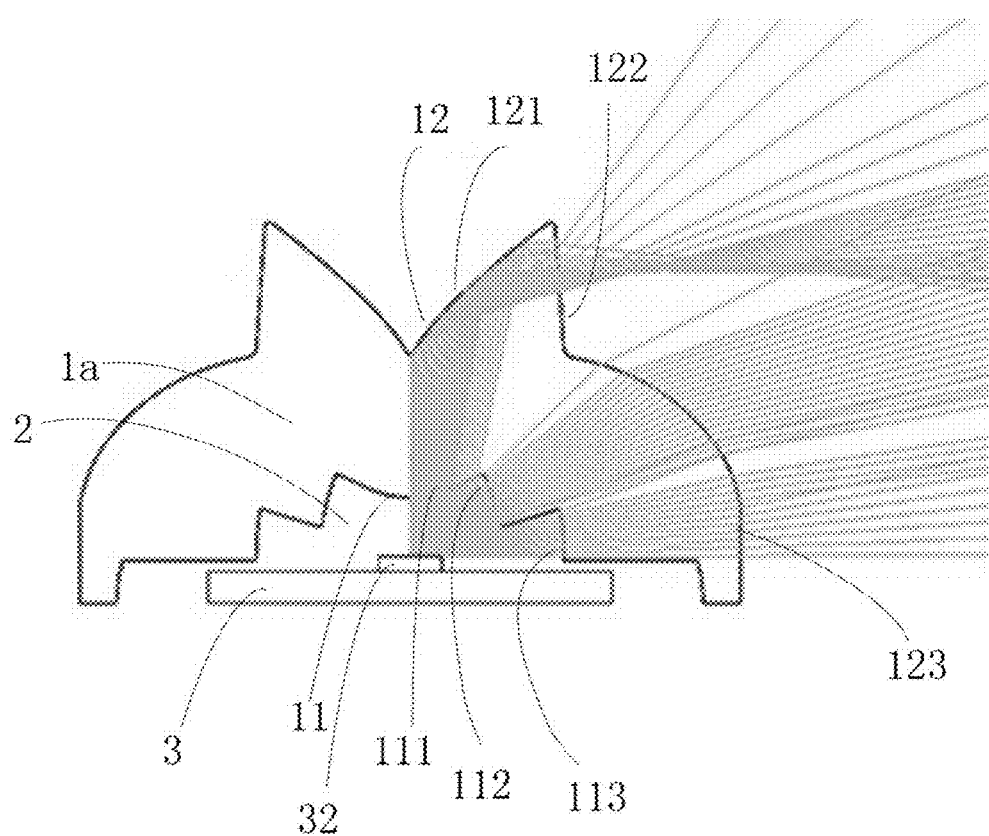
FIG. 13 is an optical path diagram of the lens based on FIG. 12.

With reference to FIG. 13, the lens 1 accommodates a light-emitting assembly 3 therein, and the light-emitting assembly 3 is provided thereon with a light emitting unit 32. Light directly incident on the first light incident surface 111 is reflected by the first light-emitting surface 121 to the second light-emitting surface 122, then refracted by the second light-emitting surface 122 and emitted out; light directly incident on the second light incident surface 112 is refracted to the third light-emitting surface 123, then refracted by the third light-emitting surface 123 and emitted out; collimated light incident on the third light incident surface 113 is refracted to the third light-emitting surface 123, refracted thereby and emitted out. In a case where it is necessary to emit light from the middle top region of the lens, the first light-emitting surface 121 may be processed, so that light incident on the first light-emitting surface 121 is partially reflected, partially refracted, and partially directly transmitted and emitted out. For example, an R angle is formed at an intersection of the two first light-emitting surfaces 121, and an outer surface of the first light-emitting surface 121 is lightly frosted, so that the portion of light to be directly emitted out through the first light-emitting surface 121 is refracted and emitted out, or directly transmitted and emitted out; thus, the light emitted by the first light-emitting surface 121 also covers the region above the first light-emitting surface 121 (not shown).

Example 3

Figure 14:
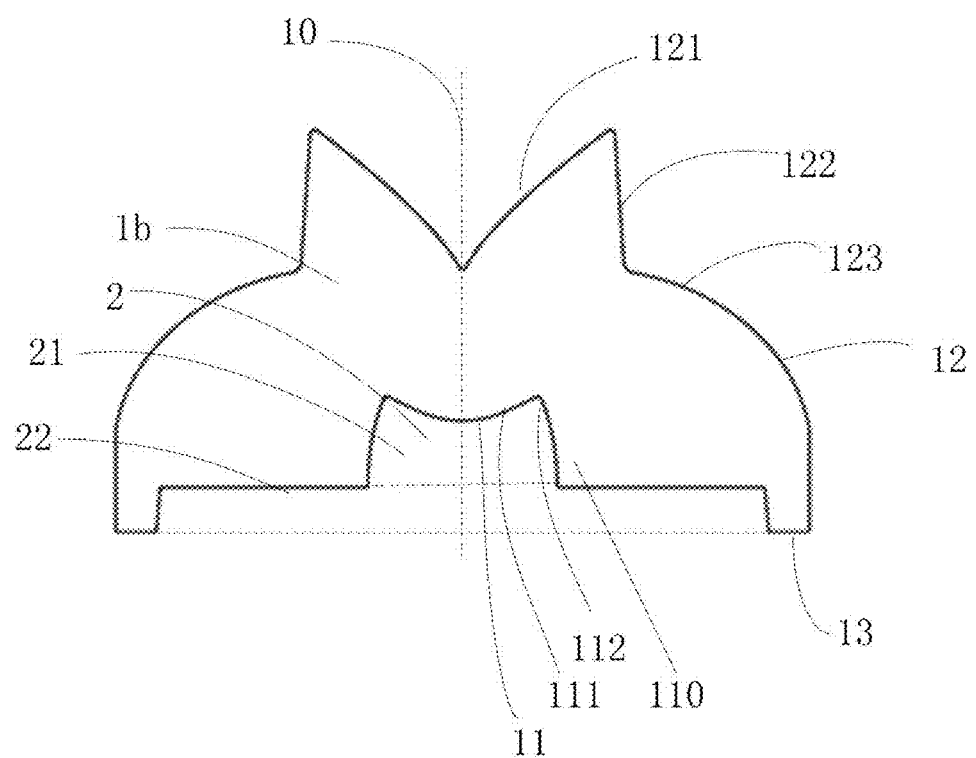
FIG. 14 is a cross-sectional view of a lens provided by Example 3 of the present disclosure.

With reference to FIG. 14, Example 3 of the present disclosure provides a lens 1b used in the lighting device 100 according to Example 1 of the present disclosure, the lens 1b has a structure similar to that of the lens 1 according to Example 1, which also has a linear shape, and its cross-section also has a symmetric structure with respect to the central axis 10. The lens 1b has an inner surface 11, an outer surface 12, a bottom surface 13, and a first accommodating chamber 2 for accommodating a light-emitting assembly (not shown); and a wall face of the first accommodating chamber 2 is the inner surface 11 of the lens 1b. In this implementation mode, the first accommodating chamber 2 includes a first accommodating region 21 and a second accommodating region 22, the first accommodating region 21 accommodates the light-emitting assembly (not shown), and the second accommodating region 22 accommodates a light source board (not shown); and in other implementation modes, the light-emitting assembly (not shown) may be all arranged in the first accommodating region 21.

The inner surface 11 includes a first light incident surface 111 protruding toward the first accommodating chamber 2, a pair of first tooth corners 110 located on two sides of a central region and arranged symmetrically with respect to the central axis 10. The pair of first tooth corners 110 include second light incident surfaces 112 provided opposite to each other, and the second light incident surface 112 is an adjacent surface of the first light incident surface 111. In this implementation mode, the first light incident surface 111 is a curved surface protruding outward, and the second light incident surface 112 is a curved surface recessed inward; the recess design of the second light incident surface 112 enables light refracted through the light incident surface 112 to be concentrated obliquely upwards.

The outer surface 12 has an axisymmetric structure, and includes first light-emitting surfaces 121 located at a middle top region and opposite to each other, second light-emitting surfaces 122 located on two sides of the two first light-emitting surfaces 121 and respectively intersecting with the adjacent first light-emitting surfaces 121, and third light-emitting surfaces 123 extending from the second light-emitting surfaces 122 to the bottom surface 13; the two first light-emitting surfaces 121 are symmetric with respect to the central axis 10 and have a V-shaped structure. The first light-emitting surface 121 may be a curved surface, or may also be a flat surface. The second light-emitting surface 122 is a flat surface, which may be parallel to the central axis 10, and may also have a certain slope. The third light-emitting surface 123 is a curved surface protruding away from the first accommodating chamber 2.

Figure 15:
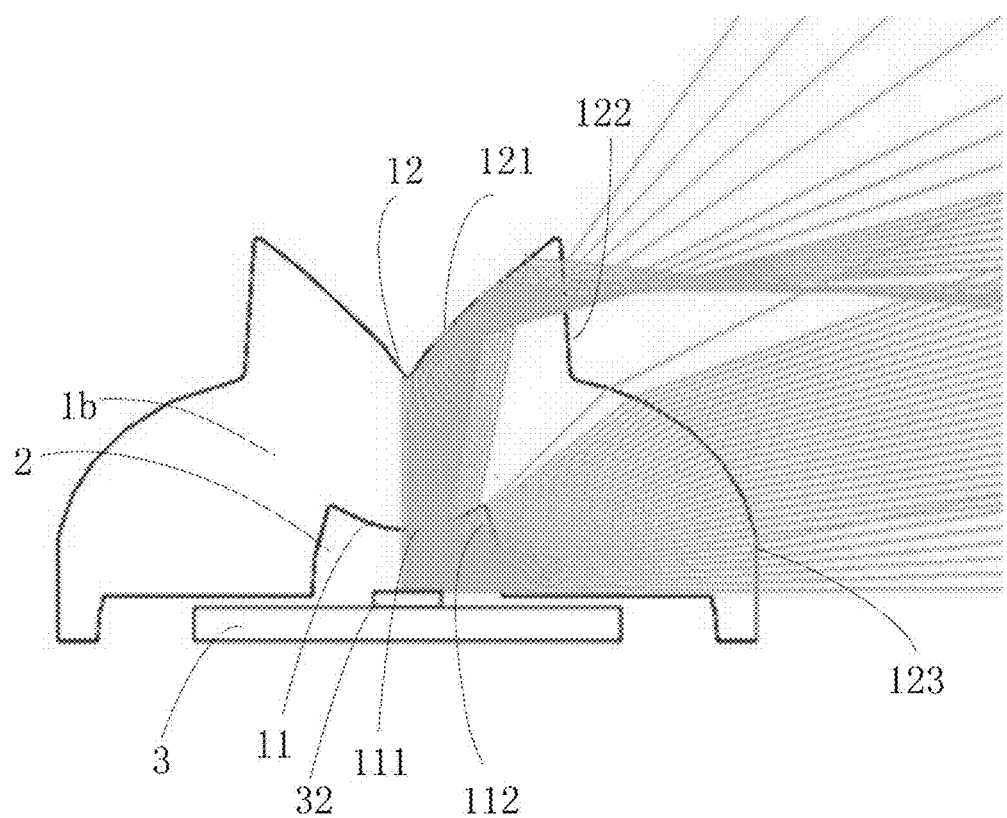
FIG. 15 is an optical path diagram of the lens of FIG. 14.

With reference to FIG. 15, the lens 1 accommodates a light-emitting assembly 3 therein, and the light-emitting assembly 3 is provided thereon with a light emitting unit 32. Light directly incident on the first light incident surface 111 is reflected by the first light-emitting surface 121 to the second light-emitting surface 122, then refracted by the second light-emitting surface 122 and emitted out; light directly incident on the second light incident surface 112 is refracted to the third light-emitting surface 123, then refracted by the third light-emitting surface 123 and emitted out. In a case where it is necessary to emit light from the middle top region of the lens 1, the first light-emitting surface 121 may be processed, so that light incident on the first light-emitting surface 121 is partially reflected, partially refracted, and partially directly transmitted and emitted out. For example, an R angle is formed at an intersection of the two first light-emitting surfaces 121, and an outer surface of the first light-emitting surface 121 is lightly frosted, so that the portion of light to be directly emitted out through the first light-emitting surface 121 is refracted and emitted out, or directly transmitted and emitted out; thus, the light emitted by the first light-emitting surface 121 also covers the region above the first light-emitting surface 121 (not shown).

Example 4

Figure 16:
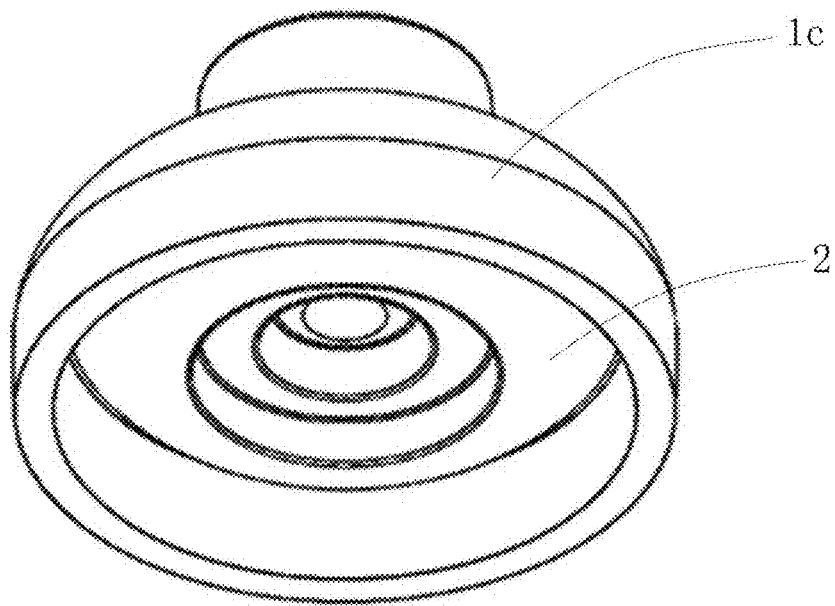
FIG. 16 is a stereoscopic view of a lens provided by Example 4 of the present disclosure.
Figure 17:
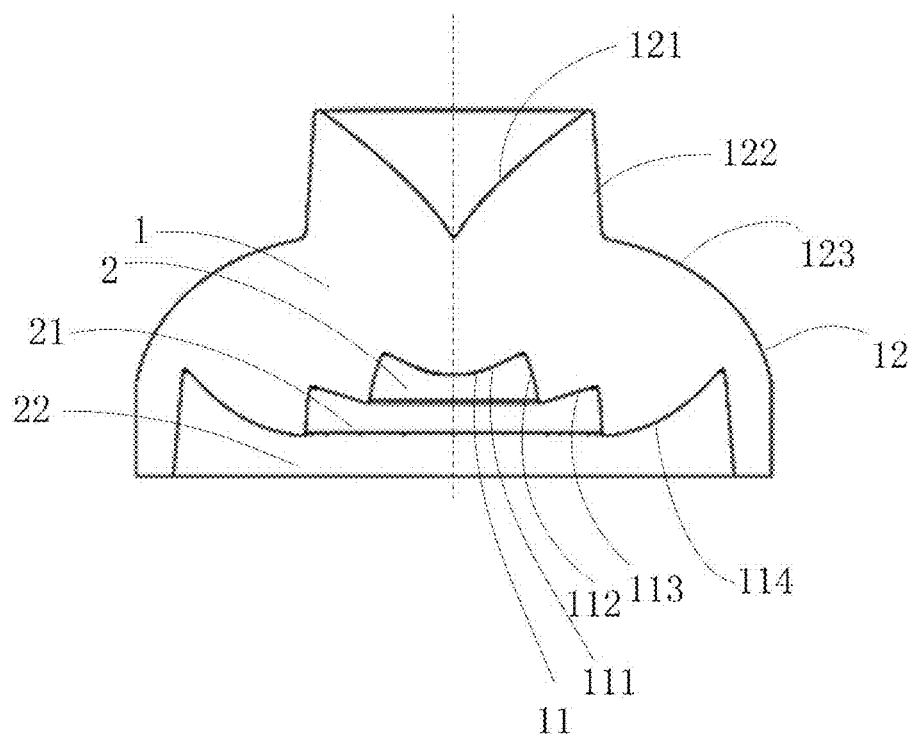
FIG. 17 is a cross-sectional view of FIG. 16.

With reference to FIG. 16 and FIG. 17, Example 4 of the present disclosure provides a lens 1c applicable to the lighting device 100 provided by Example 1 of the present disclosure, the lens 1c has a circular-shaped housing, and has a rotationally axisymmetric structure with respect to the central axis 10. The lens 1c has a first accommodating chamber 2 for accommodating a light-emitting assembly (not shown), and a wall face of the first accommodating chamber 2 is the inner surface 11 of the lens 1.

A shape of the inner surface 11 of the lens 1 may be any one of the above-described shapes according to Example 1 to Example 3.

Example 5

Figure 18:
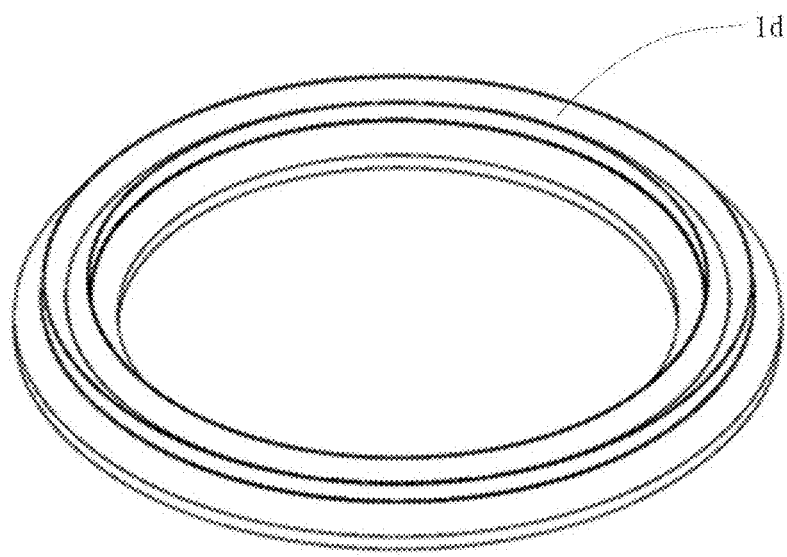
FIG. 18 is a stereoscopic view of a lens provided by Example 5 of the present disclosure.
Figure 19:
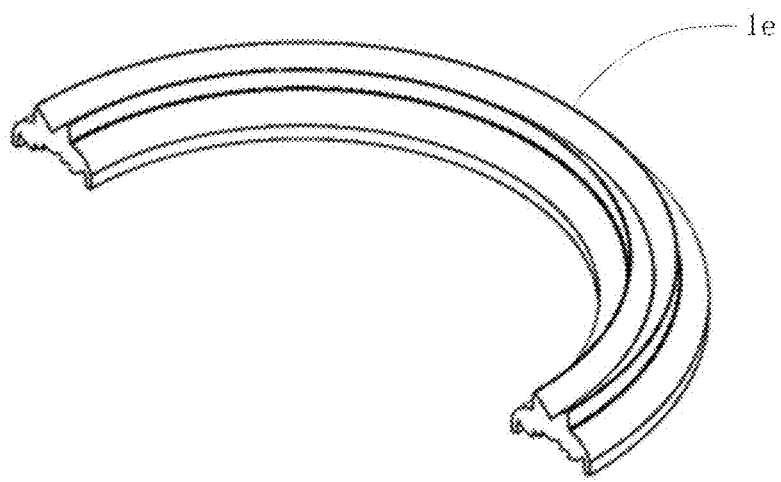
FIG. 19 is a stereoscopic view of another lens provided by Example 5 of the present disclosure.

With reference to FIG. 18, Example 5 of the present disclosure provides a annular-shaped lens 1d applicable to the lighting device 100 provided by Example 1 of the present disclosure; and with reference to FIG. 19, Example 5 of the present disclosure provides a semi annular-shaped lens 1e applicable to the lighting device 100 provided by Example 1 of the present disclosure. Both the lens 1d and the lens 1e have a first accommodating chamber 2 for accommodating a light-emitting assembly (not shown), and wall faces thereof are respectively inner surfaces (not shown) of the lens 1d and the lens 1e.

A shape of the inner surface of the lens 1d or the lens 1e may be any one of the above-described shapes according to Example 1 to Example 3.

Example 6

Figure 20:
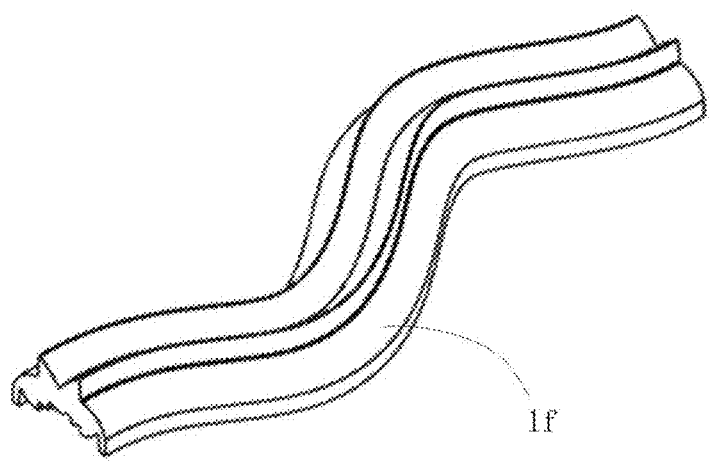
FIG. 20 is a stereoscopic view of a lens provided by Example 6 of the present disclosure.

With reference to FIG. 20, Example 6 of the present disclosure provides a curved lens if applicable to the lighting device 100 provided by Example 1 of the present disclosure. The lens if has a first accommodating chamber (not shown) for accommodating a light-emitting assembly (not shown), and a wall face thereof is an inner surface (not shown) of the lens 1f.

A shape of the inner surface of the lens if may be any one of the above-described shapes according to Example 1 to Example 3.

In the lenses according to the above-described six examples, the design of the sawtooth-shaped incident structure on the inner surface, and the design of the structure having the reflecting surface and the refracting surface combined on the outer surface, enable emitted light to cover a large angle, and the optical path segmented design enables energy of different ranges to be respectively hit at target positions, so as to increase the uniformity of emitted light through superimposition.

The present disclosure provides a lens, a light source module and a lighting device capable of emitting light at a large angle.

According to one aspect of the present disclosure, there is provided a lens, comprising a bottom surface, an inner surface, an outer surface, and a first accommodating chamber configured for accommodating a light-emitting assembly, a wall face of the first accommodating chamber being the inner surface of the lens, and the lens having an axisymmetric structure; wherein:

the inner surface has a sawtooth-shaped cross-section, and comprises a first light incident surface protruding toward the first accommodating chamber and at least two pairs of tooth corners extending into the first accommodating chamber, wherein a first pair of tooth corners comprise second light incident surfaces provided opposite to each other, and a second pair of tooth corners comprise third light incident surfaces provided opposite to each other;

the outer surface comprises two first light-emitting surfaces located at a middle top region and opposite to each other, second light-emitting surfaces located on two sides of the two first light-emitting surfaces and respectively intersecting with adjacent first light-emitting surfaces, and a third light-emitting surface extending from the second light-emitting surface to the bottom surface; the two first light-emitting surfaces constitute a V-shaped structure, and the third light-emitting surface is a curved surface protruding away from the first accommodating chamber.

Further, light directly on the first light incident surface of the lens has one portion reflected by the first light-emitting surface to the second light-emitting surface, and then refracted by the second light-emitting surface and emitted out, and the other portion directly emitted out through the first light-emitting surface, Lights incident on the second light incident surface and the third light incident surface of the lens are refracted to the third light-emitting surface, then refracted by the third light-emitting surface and emitted out.

Further, tips of the second pair of tooth corners are closer to the bottom surface than tips of the first pair of tooth corners.

Further, the second pair of tooth corners further comprises bottom wall faces configured as adjacent surfaces of the third light incident surfaces, and the inner surface further comprises a pair of side wall faces adjacent to the bottom wall faces.

Further, the bottom wall faces and the side wall faces enclose to form one accommodating region.

Further, the lens further comprises a pair of upright posts, and the upright post is composed of the side wall face, a portion of the outer surface corresponding to the side wall face, and the bottom surface.

Further, the bottom wall face is a reflecting surface, and light incident on the third light incident surface of the lens is refracted to the reflecting surface, reflected by the reflecting surface to the third light-emitting surface, refracted by the third light-emitting surface and emitted out.

Further, the other portion of light directly emitted out through the first light-emitting surface is refracted and emitted out, or directly transmitted and emitted out.

Further, the bottom wall face is a curved surface and is a total internal reflecting surface.

Further, the second light incident surface is an adjacent surface of the first light incident surface, the first light incident surface is a curved surface, and the second light incident surface and the third light incident surface are flat surfaces.

Further, the first light-emitting surface is a curved surface, the second light-emitting surface is a flat surface, and the third light-emitting surface is a curved surface.

Further, the lens has a linear axisymmetric structure or curved axisymmetric structure, extending in a longitudinal direction; a direction perpendicular to the longitudinal direction is a lateral direction; a central axis of the lens is orthogonal to both the lateral direction and the longitudinal direction; and all cross-sections of the lens at all points in the longitudinal direction are the same.

Further, the lens has a rotationally axisymmetric structure.

According to another aspect of the present disclosure, there is further provided a light source module, comprising:

the lens according to any one of the above; and a light-emitting assembly, comprising a light source board, and a light emitting unit located on the light source board.

Further, the light source module further comprises a mounting base provided under the lens.

Further, the lens is detachably assembled to the mounting base along a lengthwise extending direction.

Further, the mounting base has a gripping portion, and the lens has an extending connecting portion detachably accommodated in the gripping portion.

Further, a surface of one side of the light source board on which the light emitting unit is not provided is attached to the mounting base.

Further, the light source module further comprises baffles provided at two ends of the lens and assembled on the mounting base in a pairwise manner, and the baffles enclose a first accommodating chamber of the lens.

Further, the baffle is attached to an end surface of the lens, and has at least a pair of clamping portions extending from an end surface thereof, and the baffle is clamped between the mounting base and the lens and extending into the first accommodating chamber of the lens.

Further, the light source module has a straight-bar shape, and the light source board and the lens both have a straight-bar shape.

Further, the light-emitting assembly comprises a plurality of light emitting units, and the light emitting units are arranged along a longitudinal direction of the light source board at equal intervals.

Further, a width of the lens is equal to or smaller than 32 mm.

According to another aspect of the present disclosure, there is further provided a lighting device, comprising a base plate, a front cover coupled with the base plate, and the light source module according to any one of the above fixed on the base plate.

Further, the front cover and the base plate are coupled to form a second accommodating chamber, and the light source module is accommodated in the second accommodating chamber.

Further, the base plate has a rectangular shape, the lens has a straight-bar shape, and both ends of the lens are located at middle positions of lateral side walls of the base plate, and extend along a direction of longitudinal side walls of the base plate.

Further, a width of the base plate is greater than 550 mm.

Further, a ratio of a width of the lens to the width of the base plate is less than 0.06.

Advantageous effects: in the lens, the light source module and the lighting device according to the present disclosure, by means of arranging a sawtooth-shaped inner surface, the lens utilizes the dual effect of internal reflection and refraction to enable emitted light of the lighting device to be distributed across a larger angle and satisfy requirements of high uniformity.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The purpose, technical solutions and beneficial effects of the present disclosure are further explained in detail in the specific examples as described above. It should be understood that the foregoing examples merely are specific examples of the present disclosure, and not intended to limit the present disclosure. Any modification, equivalent substitution, improvement, and the like, made within the spirit and principles of the present disclosure should be covered within the protection scope of the present disclosure.

The invention claimed is:

1. A lens, comprising:
   a bottom surface,
   an inner surface,
   an outer surface, and
   a first accommodating chamber configured for accommodating a light-emitting assembly, a wall face of the being the inner surface of the lens, and the lens having an axisymmetric structure; wherein:
   the inner surface comprises a sawtooth-shaped cross-section a first light incident surface protruding toward the first accommodating chamber and at least two pairs of tooth corners extending into the first accommodating chamber; a first pair of tooth corners comprise second light incident surfaces provided opposite to each other; and a second pair of tooth corners comprise third light incident surfaces provided opposite to each other, wherein the third light incident surface is directly connected to a curved reflecting surface that directly reflects light from the third light incident surface to a third light-emitting surface and wherein the reflecting surface encloses, from a top direction that faces the bottom surface, the first accommodating chamber;
   the outer surface comprises two first light-emitting surfaces located at a middle top region and opposite to each other, second light-emitting surfaces located on two sides of the two first light-emitting surfaces and intersecting with adjacent first light-emitting surfaces, and the third light-emitting surface extending from the second light-emitting surface to the bottom surface, wherein the two first light-emitting surfaces constitute a V-shaped structure, and the third light-emitting surface is a curved surface protruding away from the first accommodating chamber.

2. The lens according to claim 1, wherein:
   light incident on the first light incident surface of the lens has one portion reflected by the first light-emitting surface to the second light-emitting surface and refracted by the second light-emitting surface and emitted out, and other portion directly emitted out through the first light-emitting surface,
   lights incident on the second light incident surface and the third light incident surface of the lens are refracted to the third light-emitting surface, and refracted by the third light-emitting surface and emitted out.

3. The lens according to claim 1, wherein tips of the second pair of tooth corners are closer to the bottom surface than tips of the first pair of tooth corners.

4. The lens according to claim 3, wherein the second pair of tooth corners further comprises bottom wall faces configured as adjacent surfaces of the third light incident surfaces, and the inner surface further comprises a pair of side wall faces adjacent to the bottom wall faces.

5. The lens according to claim 4, wherein the bottom wall faces and the side wall faces form one accommodating region.

6. The lens according to claim 4, further comprises a pair of upright posts, wherein the upright post comprises the side wall face, a portion of the outer surface corresponds to the side wall face, and the bottom surface.

7. The lens according to claim 4, wherein the bottom wall face is a reflecting surface, and light incident on the third light incident surface of the lens is refracted to the reflecting surface, reflected by the reflecting surface to the third light-emitting surface, refracted by the third light-emitting surface and emitted out.

8. The lens according to claim 7, wherein the other portion of light directly emitted out through the first light-emitting surface is refracted and emitted out, or directly transmitted and emitted out.

9. The lens according to claim 4, wherein the bottom wall face is a curved surface and is a total internal reflecting surface.

10. The lens according to claim 1, wherein the second light incident surface is an adjacent surface of the first light incident surface, the first light incident surface is a curved surface, and the second light incident surface and the third light incident surface are flat surfaces.

11. The lens according to claim 1, wherein the first light-emitting surface is a curved surface, the second light-emitting surface is a flat surface, and the third light-emitting surface is a curved surface.

12. The lens according to claim 1, wherein the lens has a linear axisymmetric structure or curved axisymmetric structure, extending in a longitudinal direction; wherein a direction perpendicular to the longitudinal direction is a lateral direction; a central axis of the lens is orthogonal to both the lateral direction and the longitudinal direction; and all cross-sections of the lens at all points in the longitudinal direction are the same.

13. The lens according to claim 1, wherein the lens has a rotationally axisymmetric structure.

14. A light source module, comprising: a lens and a light-emitting assembly comprising a light source board, and a light emitting unit located on the light source board, wherein the lens comprises:
   a bottom surface, an inner surface, an outer surface, and a first accommodating chamber configured for accommodating a light-emitting assembly, a wall face of the first accommodating chamber being the inner surface of the lens, and the lens having an axisymmetric structure; wherein:
   the inner surface comprises a sawtooth-shaped cross-section a first light incident surface protruding toward the first accommodating chamber and at least two pairs of tooth corners extending into the first accommodating chamber; a first pair of tooth corners comprise second light incident surfaces provided opposite to each other; and a second pair of tooth corners comprise third light incident surfaces provided opposite to each other, wherein the third light incident surface is directly connected to a curved reflecting surface that directly reflects light from the third light incident surface to a third light-emitting surface and wherein the reflecting surface encloses, from a top direction that faces the bottom surface, the first accommodating chamber;

the outer surface comprises two first light-emitting surfaces located at a middle top region and opposite to each other, second light-emitting surfaces located on two sides of the two first light-emitting surfaces and intersecting with adjacent first light-emitting surfaces, and the third light-emitting surface extending from the second light-emitting surface to the bottom surface, wherein the two first light-emitting surfaces constitute a V-shaped structure, and the third light-emitting surface is a curved surface protruding away from the first accommodating chamber.

15. The light source module according to claim 14, further comprising a mounting base provided under the lens.

16. The light source module according to claim 15, wherein the lens is detachably assembled to the mounting base along a lengthwise extending direction.

17. The light source module according to claim 15, wherein the mounting base has a gripping portion, and the lens has an extending connecting portion detachably accommodated in the gripping portion.

18. The light source module according to claim 15, wherein a surface of the light source board on which the light emitting unit is not provided is attached to the mounting base.

19. The light source module according to claim 15, further comprising baffles provided at two ends of the lens and assembled on the mounting base in a pairwise manner, wherein the baffles enclose a first accommodating chamber of the lens.

20. The light source module according to claim 19, wherein the baffle is attached to an end surface of the lens, and has at least a pair of clamping portions extending from an end surface thereof, and the baffle is clamped between the mounting base and the lens and extending into the first accommodating chamber of the lens.

\* \* \* \* \*